(12) United States Patent
Bauder

(10) Patent No.: US 7,222,872 B1
(45) Date of Patent: May 29, 2007

(54) HITCH DAMPING SYSTEM

(76) Inventor: Jerrlyn K. Bauder, 1435 Riverview Dr., Huron, SD (US) 57350

( * ) Notice: Subject to any disclaimer, the term of this patent is extended or adjusted under 35 U.S.C. 154(b) by 0 days.

(21) Appl. No.: 11/099,793

(22) Filed: Apr. 6, 2005

Related U.S. Application Data

(62) Division of application No. 10/436,483, filed on May 12, 2003, now Pat. No. 6,913,276.

(51) Int. Cl.
B60D 1/00 (2006.01)

(52) U.S. Cl. ...................................... 280/439; 280/486

(58) Field of Classification Search ................ 280/439, 280/440, 441, 493, 486, 489
See application file for complete search history.

(56) References Cited

U.S. PATENT DOCUMENTS

| 3,399,907 | A | * | 9/1968 | Hein ........................... 280/440 |
| 3,869,147 | A | | 3/1975 | Fry |
| 3,893,712 | A | * | 7/1975 | Sallier ......................... 280/440 |
| 3,918,744 | A | * | 11/1975 | Gay ........................ 280/418.1 |
| 3,990,722 | A | | 11/1976 | Casad et al. |
| 4,279,430 | A | | 7/1981 | Tagg et al. |
| 4,444,408 | A | | 4/1984 | Goth |
| 4,641,852 | A | * | 2/1987 | Kerst et al. .................. 280/489 |
| 5,328,198 | A | | 7/1994 | Adams |
| 5,707,070 | A | | 1/1998 | Lindenman et al. |
| 5,772,229 | A | | 6/1998 | Cattau |
| 5,785,341 | A | | 7/1998 | Fenton |
| 5,823,560 | A | | 10/1998 | Van Vleet |
| 5,851,021 | A | | 12/1998 | Van Kley |
| 6,170,849 | B1 | | 1/2001 | McCall |
| 6,170,850 | B1 | | 1/2001 | Works |
| 6,357,777 | B1 | | 3/2002 | Linger et al. |
| 6,474,674 | B2 | | 11/2002 | Piercey, III |
| 6,485,045 | B1 | | 11/2002 | King |
| 6,494,478 | B1 | | 12/2002 | Mackarvich |
| 2002/0125683 | A1 | | 9/2002 | Lange |
| 2003/0178811 | A1 | * | 9/2003 | Buckner ..................... 280/483 |
| 2004/0169348 | A1 | | 9/2004 | Winckler |

* cited by examiner

Primary Examiner—Kevin Hurley
(74) Attorney, Agent, or Firm—Jeffrey A. Proehl; Woods, Fuller, Shultz & Smith, PC

(57) ABSTRACT

A hitch damping system for dampening forces transferred between a towed vehicle and a towing vehicle. The hitch damping system includes a first assembly being designed for being operationally coupled to the towed vehicle. A second assembly is designed for being operationally coupled to the towing vehicle. A plurality of dampening members are operationally coupled between the first assembly and the second assembly. The dampening members permit the first assembly to swing in an arc with respect to the second assembly whereby the dampening members are designed for reducing longitudinal forces exerted on the towing vehicle, such as a truck, by the towed vehicle, such as a fifth wheel trailer, when a momentum of the towed vehicle differs from a momentum of the towing vehicle.

11 Claims, 7 Drawing Sheets

HITCH DAMPING SYSTEM

CROSS REFERENCE TO RELATED APPLICATION

This application is a divisional of application Ser. No. 10/436,483, filed May 12, 2003 now U.S. Pat. No. 6,913,276.

BACKGROUND OF THE INVENTION

1. Field of the Invention

The present invention relates to gliding fifth wheel attachments and more particularly pertains to a new hitch damping system for dampening forces transferred between a towed vehicle and a towing vehicle.

2. Description of the Prior Art

The use of gliding fifth wheel attachments is known in the prior art. U.S. Pat. No. 6,357,777 describes a system for mounting a fifth wheel hitch that allows the hitch to be adjust to provide greater maneuverability when towing the towed vehicle. Another type of gliding fifth wheel attachment is U.S. Pat. No. 5,707,070 having a fifth wheel hitch that is adjustable between a maneuvering position and a towing position. U.S. Pat. No. 3,990,722 has a trailer hitch that absorbs end thrust shocks between a towed vehicle and a towing vehicle. U.S. Pat. No. 5,772,229 has a hitch that can be selectively moved along the length of runners to allow for selectively changing the mounting position of the hitch with respect to the towing vehicle. U.S. Pat. No. 6,170,489 has a fifth wheel hitch with air suspension bags and shock absorbers to absorb vertical forces exerted between the trailer tongue and the vehicle. U.S. Pat. No. 6,485,045 has a pin box hitch member that is coupled to a superstructure that is selectively movable to allow access to a ball hitch positioned below the superstructure. U.S. Pat. No. 4,279,430 has a suspension system for fifth wheel connections that has an air suspension bag for absorbing vertical forces being transferred between the trailer and the towing vehicle. U.S. Pat. No. 6,494,478 has a trailer hitch that has torsional spring apparatus coupled between a draw bar and a ball hitch so that the torsional spring absorbs shocks and surges between the towing vehicle and the trailer. U.S. Pat. No. 6,170,850 has a fifth wheel type hitch that receives a king pin of a trailer to coupled the trailer to a towing vehicle. U.S. Pat. No. 5,823,560 has a trailer hitch that has a dampening mechanism for absorbing vertical forces and a dampening mechanism for absorbing horizontal forces transferred between the trailer and the towing vehicle. U.S. Patent Application Publication No. 2002/0125683 has a fifth wheel hitch that has air suspension bags to absorb motion between the trailer and the towing vehicle.

While these devices fulfill their respective, particular objectives and requirements, the need remains for a system that has certain improved features dampens longitudinal forces between the towing vehicle and the towed vehicle.

SUMMARY OF THE INVENTION

The present invention meets the needs presented above by providing a plurality of dampening members being operationally coupled between a first assembly coupled to the towed vehicle and a second assembly coupled to the towing vehicle which allows the first assembly to swing with respect to the second assembly and thereby dampen longitudinal forces between the towing vehicle and the towed vehicle.

Still yet another object of the present invention is to provide a new hitch damping system that uses the weight of the towed vehicle to dampened the longitudinal forces as the first assembly swings upwardly from bottom dead center and thereby works against the weight of the towed vehicle.

Even still another object of the present invention is to provide a new hitch damping system that isolates the first assembly from the second assembly so that the first assembly is not rigidly coupled to the second assembly.

To this end, the present invention generally comprises a first assembly being designed for being operationally coupled to the towed vehicle. A second assembly is designed for being operationally coupled to the towing vehicle. A plurality of dampening members are operationally coupled between the first assembly and the second assembly. The dampening members permit the first assembly to swing in an arc with respect to the second assembly whereby the dampening members are designed for reducing longitudinal forces exerted on the towing vehicle, such as a truck, by the towed vehicle, such as a fifth wheel trailer, when a momentum of the towed vehicle differs from a momentum of the towing vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
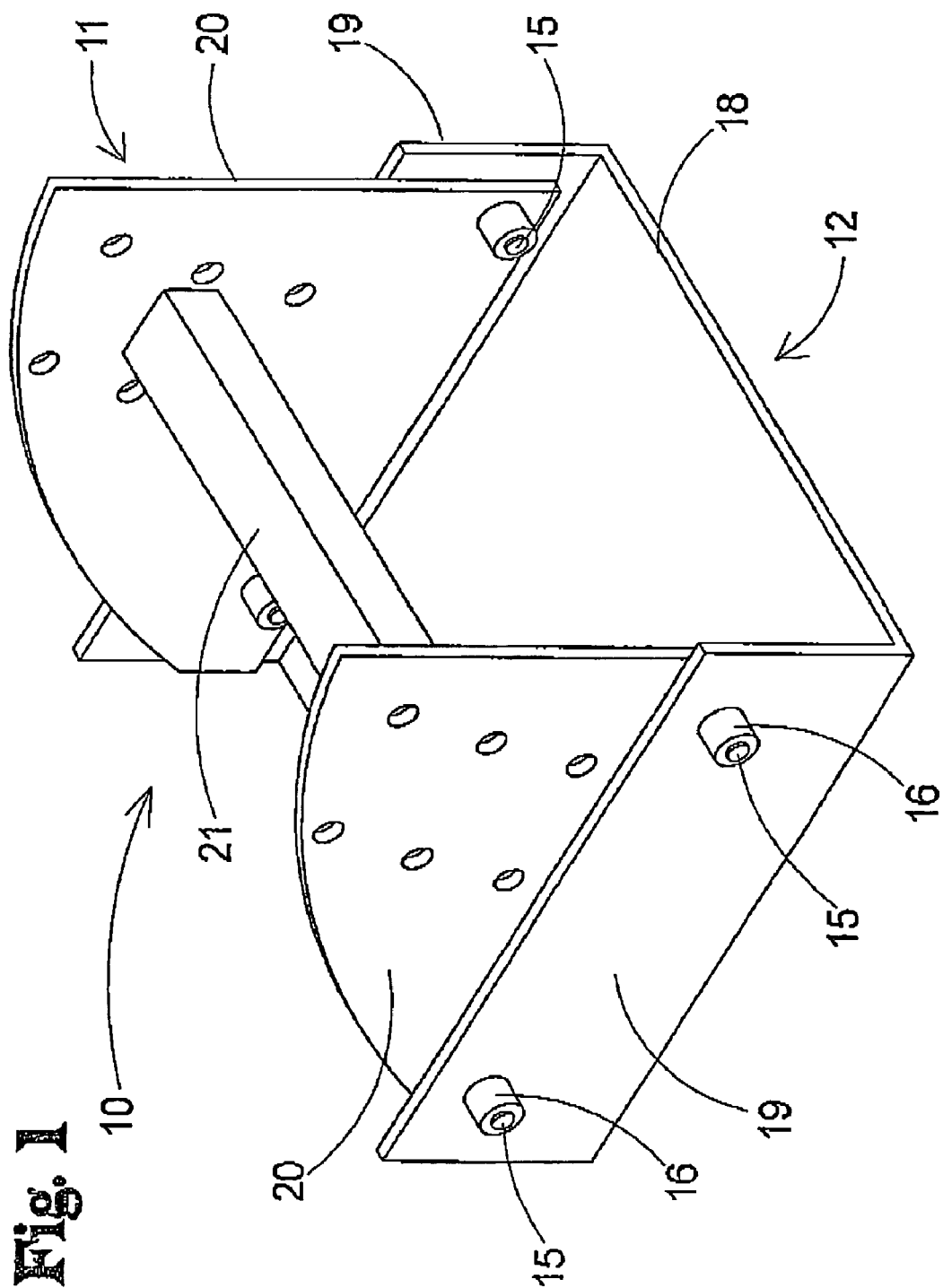
FIG. 1 is a perspective view of a new hitch damping system according to the present invention.
Figure 2:
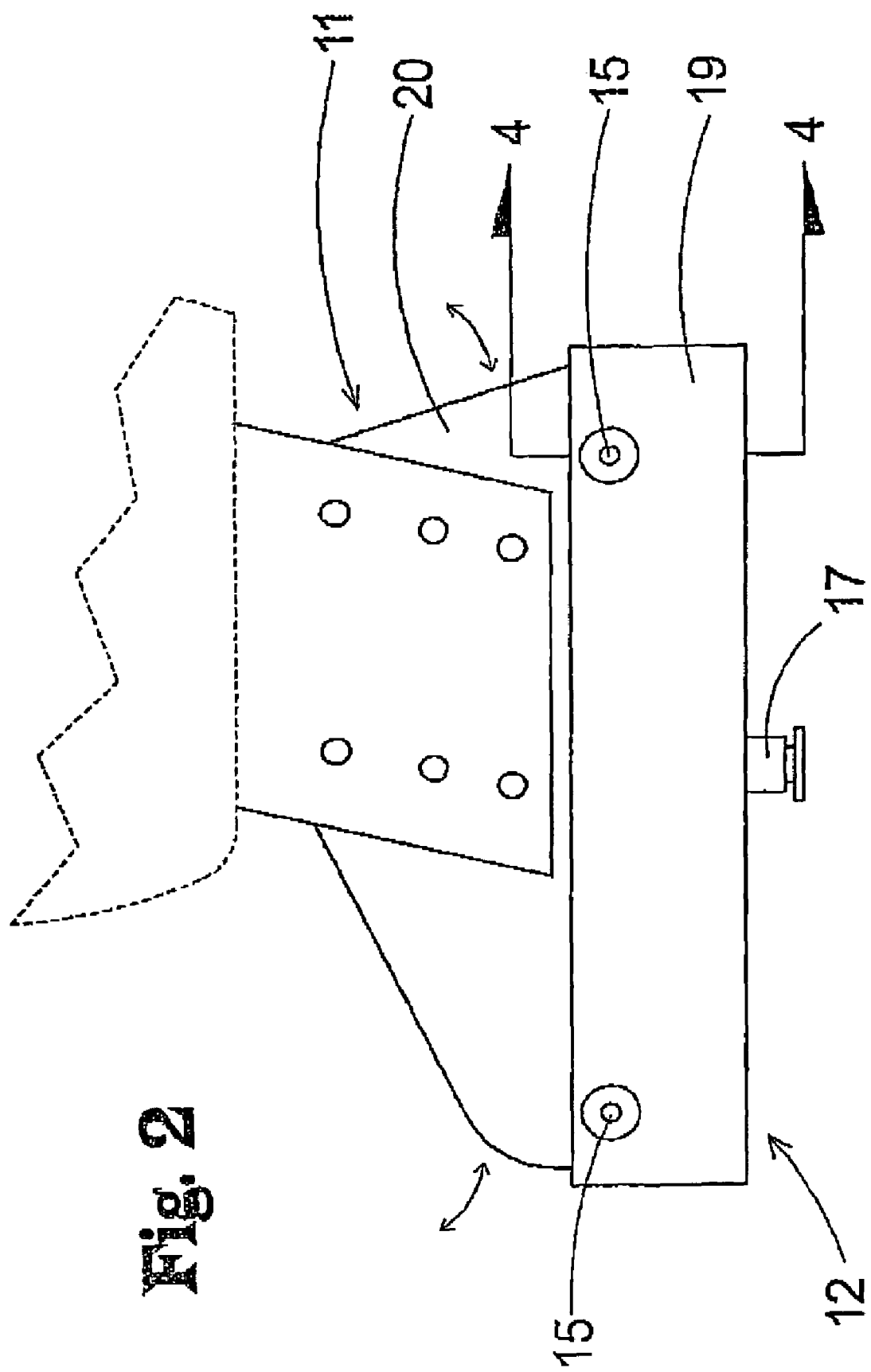
FIG. 2 is a side view of the present invention.
Figure 3:
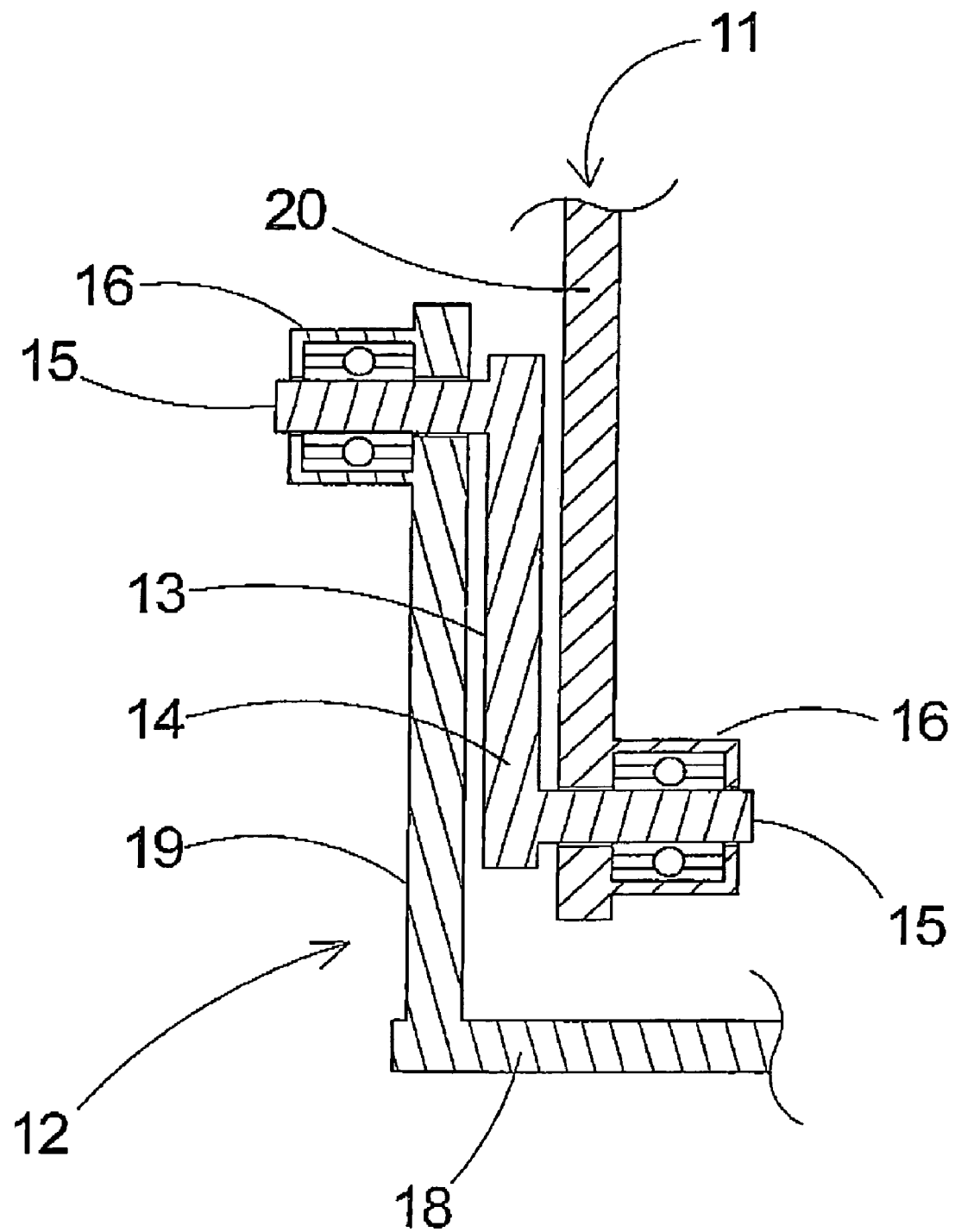
FIG. 3 is a cross-sectional view of the present invention taken along line 4—4 of FIG. 3.
Figure 4:
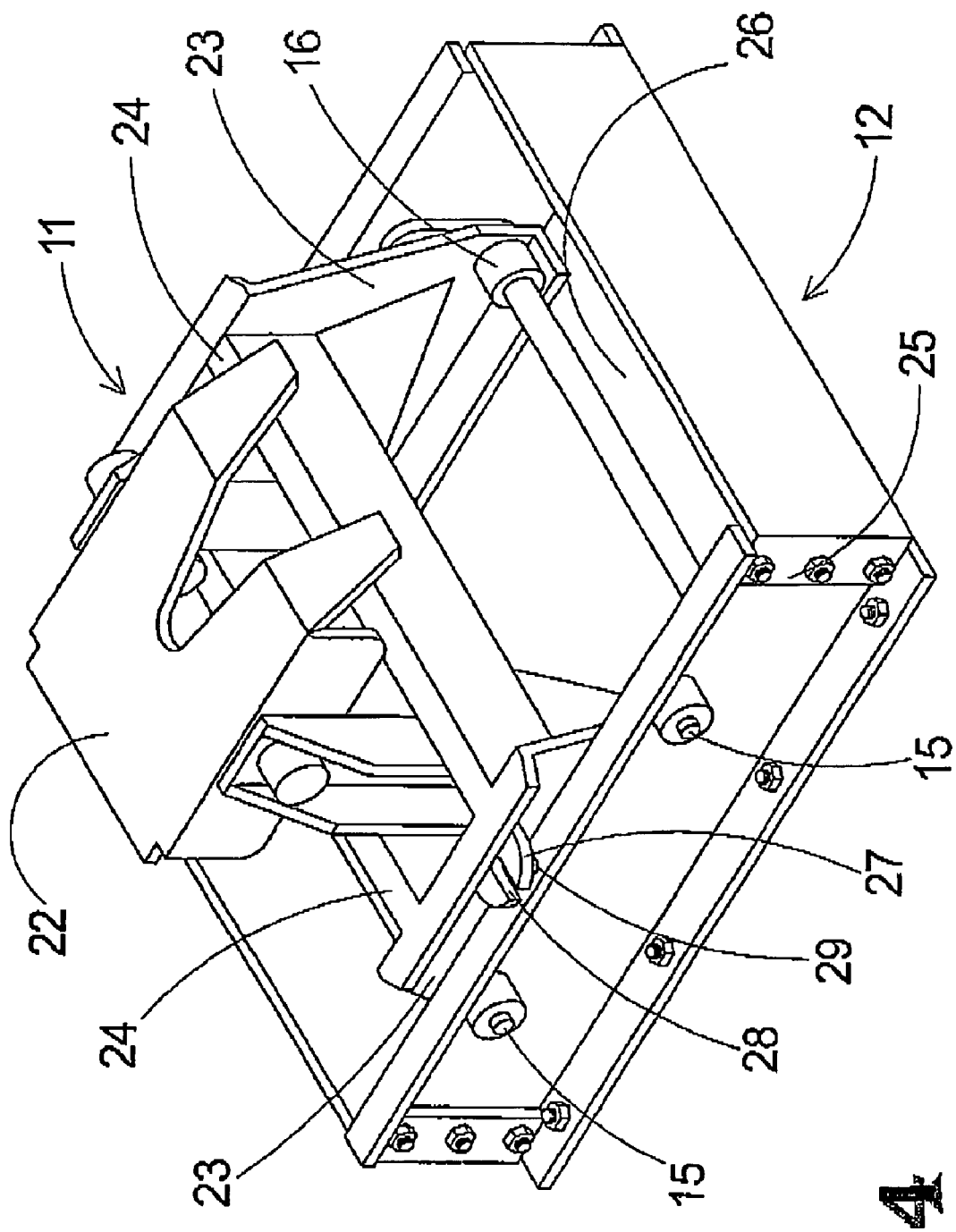
FIG. 4 is a perspective view of an alternate embodiment of the present invention.
Figure 5:
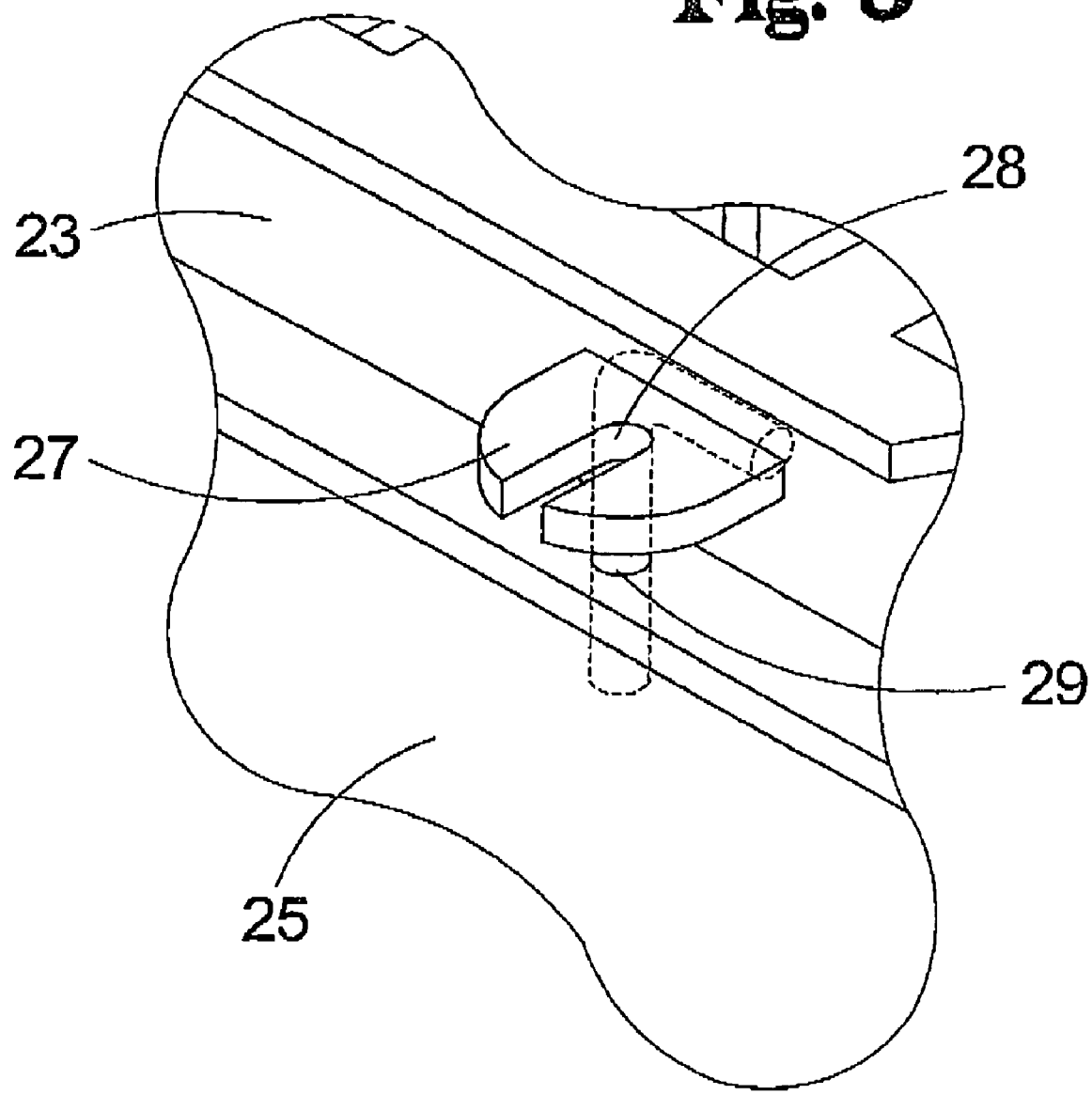
FIG. 5 is an enlarged perspective view of the locking tab and locking bore of the alternate embodiment of the present invention.
Figure 6:
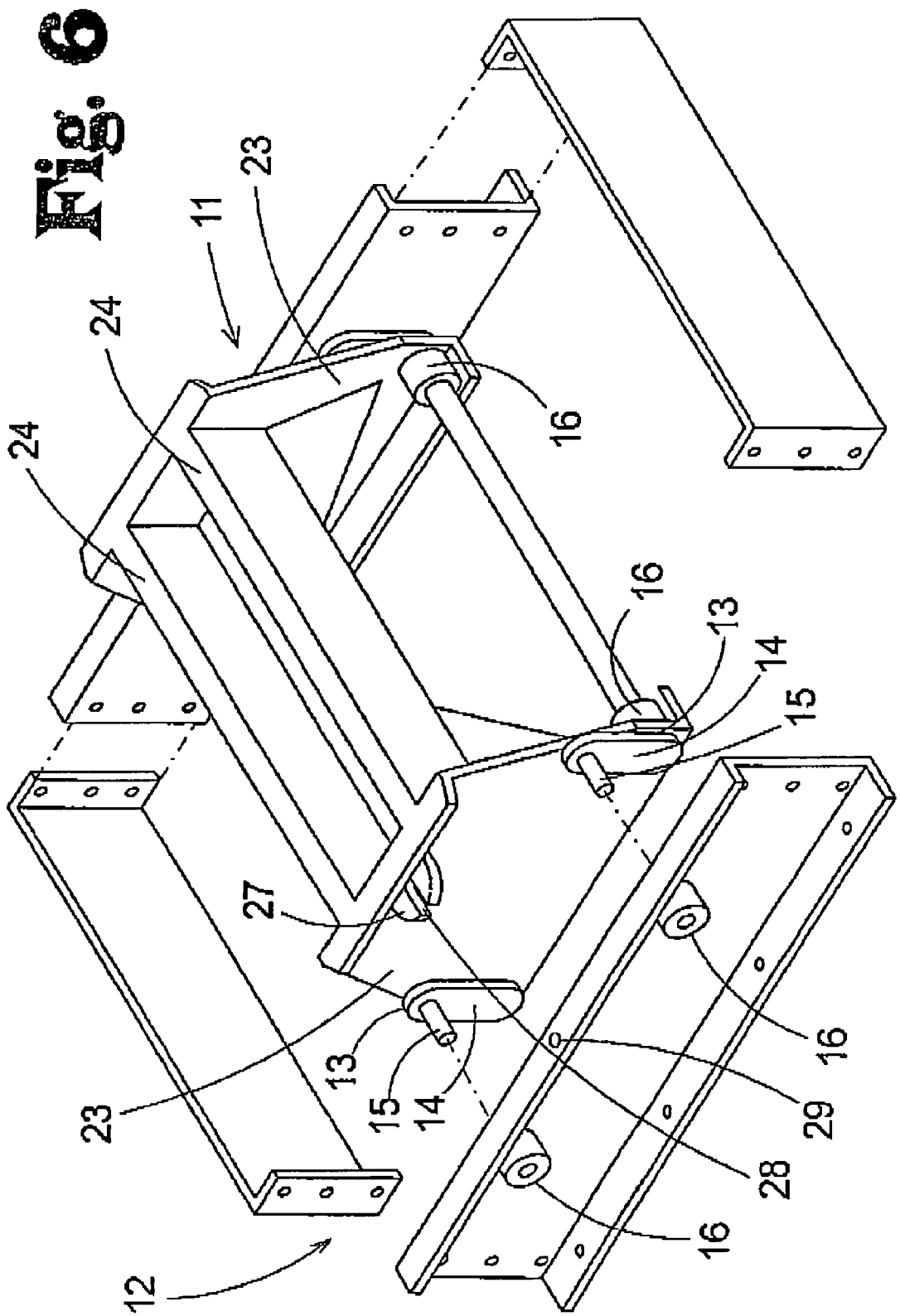
FIG. 6 is an exploded perspective view of the first assembly and the second assembly of the alternate embodiment of the present invention.
Figure 7:
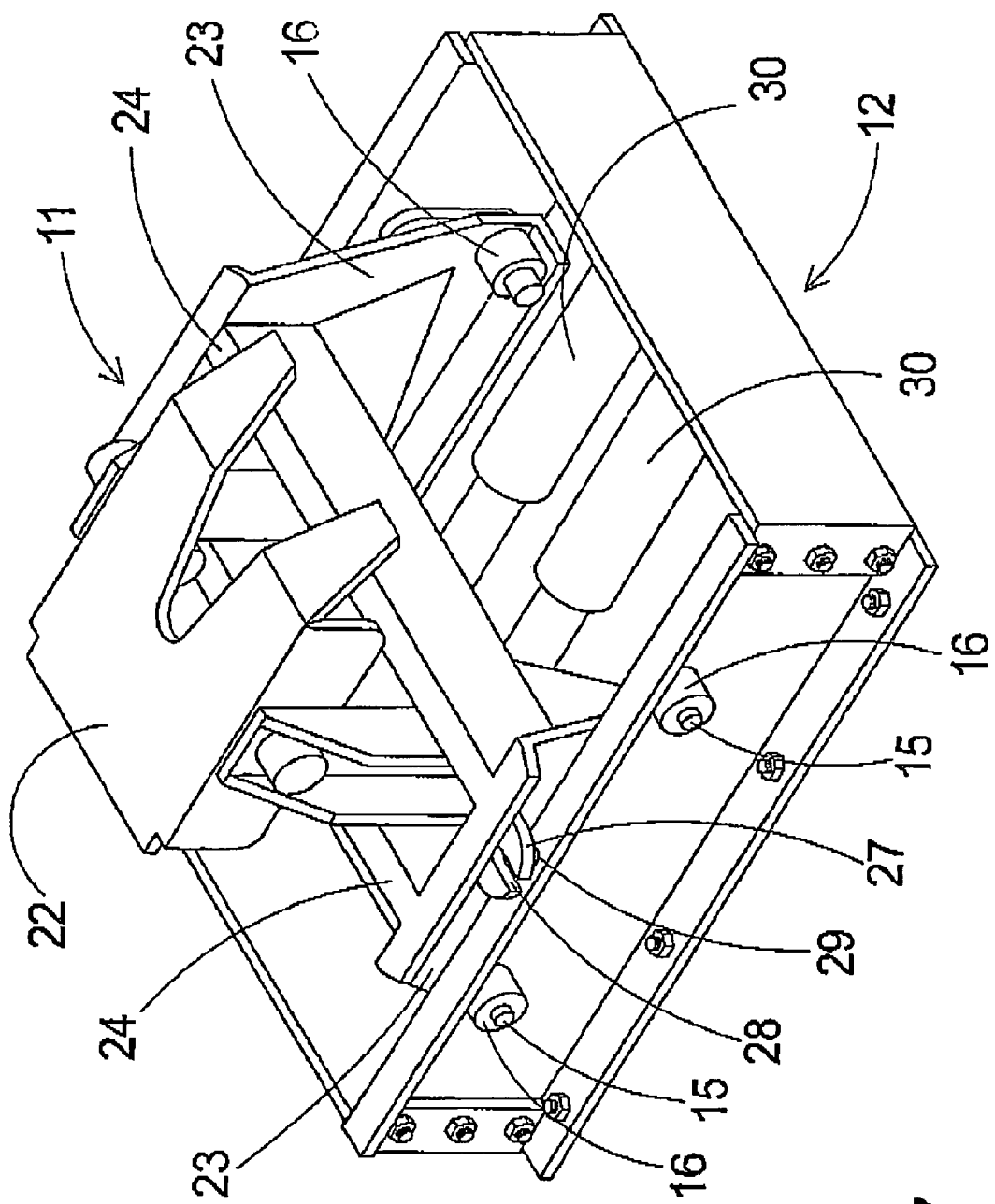
FIG. 7 is a perspective view of the shock absorbing assemblies of the alternate embodiment of the present invention.

With reference now to the drawings, and in particular to FIGS. 1 through 7 thereof, a new hitch damping system embodying the principles and concepts of the present invention and generally designated by the reference numeral 10 will be described.

As best illustrated in FIGS. 1 through 7, the hitch damping system 10 generally comprises a first assembly 11 being designed for being operationally coupled to the towed vehicle. A second assembly 12 is designed for being operationally coupled to the towing vehicle.

A plurality of dampening members 13 are operationally coupled between the first assembly 11 and the second assembly 12. The dampening members 13 permit the first assembly 11 to swing in an arc with respect to the second assembly 12 whereby the dampening members 13 are designed for reducing longitudinal forces exerted on the towing vehicle, such as a truck, by the towed vehicle, such as a fifth wheel trailer, when a momentum of the towed vehicle differs from a momentum of the towing vehicle. The momentum of the towed vehicle can change whenever there is a change in velocity of the towed vehicle such as when the towed vehicle is being pulled over an uneven surface or strikes an object on the road causing a slight change in the velocity of the towed vehicle and thereby causing a force to be applied to the towing vehicle which is lessened by the dampening members 13. A change in momentum may also occur due to the sudden acceleration or deceleration of the towing vehicle.

Each of the dampening members 13 comprises a swing arm 14. The swing arm 14 of each of the dampening members 13 is rotatably coupled to the first assembly 11. The swing arm 14 of each of the dampening members 13 is rotatably coupled to the second assembly 12 opposite the first assembly 11 whereby the swing arm 14 of each of the dampening members 13 comprises the radius of the arc the first assembly 11 swings with respect to the second assembly 12 to reduce the force exerted on the towing vehicle by the towed vehicle when the momentum of the towed vehicle differs from the momentum of the towing vehicle.

Each of the dampening members 13 comprises a pair of pivot rods 15. Each of the pivot rods 15 is coupled to opposing ends of the swing arm 14 of the associated one of the dampening members 13. One of the pivot rods 15 is rotatably coupled to the first assembly 11 whereby the other one of the pivot rods 15 is rotatably coupled to the second assembly 12. The pivot rods 15 are for permitting the swing arm 14 of the associated one of the dampening members 13 to rotate with respect to the first assembly 11 and the second assembly 12 whereby the first assembly 11 swings in an arc with respect to the second assembly 12.

Each of the dampening members 13 comprises a pair of bearing portions 16. Each of the bearing portions 16 is operationally coupled to one of the pivot rods 15 of the associated one of the dampening members 13. The bearing portions 16 are for facilitating rotation of the pivot arms with respect to the first assembly 11 and the second assembly 12.

A pin member 17 is coupled to the second assembly 12. The pin member 17 is designed for being coupled to a fifth wheel mount of the towing vehicle whereby the pin member 17 is for operationally coupling the towed vehicle to the towing vehicle when the towed vehicle is to be towed by the towing vehicle.

The second assembly 12 comprises a base plate 18 and pair of side plates 19. Each of the side plates 19 is oppositely coupled to the base plate 18 whereby the side plates 19 and the base plate 18 define a channel. The first assembly 11 is suspended in the channel by the dampening members 13 whereby the dampening members 13 are positioned between the side plates 19 and the first assembly 11 to permit the first assembly 11 to swing in the channel. The pin member 17 is coupled to the base plate 18 of the second assembly 12.

The first assembly 11 comprises a pair of mounting plates 20. Each of the dampening members 13 is coupled to one of the mounting plates 20 whereby the dampening members 13 are positioned between the associated one of the mounting plates 20 and an associated one of the side plates 19 of the second assembly 12. The mounting plates 20 are designed for being mounted to the towed vehicle whereby the mounting plates 20 are for operationally coupling the towed vehicle to the second assembly 12.

The first assembly 11 comprises a reinforcing member 21. The reinforcing member 21 is coupled to the mounting plates 20 whereby the reinforcing member 21 extends between the mounting plates 20. The reinforcing member 21 is for maintaining positioning of the mounting plates 20 whereby the reinforcing member 21 is for inhibiting collapsing of the mounting plates 20 and damaging the towed vehicle and the towing vehicle.

In an embodiment, as shown in FIGS. 4 through 7, a head assembly 22 is coupled to the first assembly 11. The head assembly 22 is designed for selectively receiving a hitch pin of the towed vehicle whereby the head assembly 22 is for selectively securing the towed vehicle to the towing vehicle when the head assembly 22 receives the hitch pin.

The first assembly 11 comprises a pair of swing plates 23. Each of the dampening members 13 is coupled to one of the swing plates 23 whereby each of the dampening members 13 is positioned between the associated one of the swing plates 23 and the second assembly 12. The dampening members 13 permit the swing plates 23 to swing with respect to the second assembly 12. The head assembly 22 is operationally coupled between the swing plates 23 whereby the head assembly 22 is designed for operationally coupling the swing plates 23 to the towed vehicle.

The first assembly 11 comprises a pair of mounting members 24. Each of the mounting members 24 is coupled to the swing plates 23 whereby the mounting members 24 extend between the swing plates 23. One of the mounting members 24 is positioned in a spaced relationship to the other one of the mounting members 24. The head assembly 22 is pivotally coupled to the mounting members 24 whereby a portion of the head assembly 22 is positioned between the mounting members 24. The head assembly 22 pivots with respect to the mounting members 24 to accommodate minor rolling of the towed vehicle with respect to the towing vehicle.

The second assembly 12 comprises a perimeter wall 25. The perimeter wall 25 defines an aperture 26 whereby the first assembly 11 is positioned in the aperture 26 defined by the perimeter wall 25. The dampening members 13 are coupled to the perimeter wall 25 whereby each of the dampening members 13 is positioned between the perimeter wall 25 and the associated one of the swing plates 23 of the first assembly 11. The perimeter wall 25 is designed for being mounted to the towing vehicle.

The first assembly 11 comprises a locking plate 27. The locking plate 27 is coupled to one of the swing plates 23 of the first assembly 11. The locking plate 27 comprises a notch 28 extending into the locking plate 27. The notch 28 of the locking plate 27 is selectively aligned with a locking bore 29 extending into the perimeter wall 25 of the second assembly 12 whereby the notch 28 of the locking plate 27 and the locking bore 29 of the perimeter wall 25 are designed for selectively receiving a locking pin to selectively inhibit movement of the first assembly 11 with respect to the second assembly 12 to facilitate engaging the hitch pin of the towed vehicle with the head assembly 22 when the notch 28 and the locking bore 29 are aligned.

A plurality of shock absorbing assemblies 30 are operationally coupled between the perimeter wall 25 of the second assembly 12 and the swing plates 23 of the first assembly 11. Each of the shock absorbing assemblies 30 is designed for absorbing longitudinal forces between the towed vehicle and the towing vehicle.

In use, the user mounts the mounting plates 20 of the first assembly 11 to the towed vehicle. The user then backs the towing vehicle up to the towed vehicle and secures the pin member 17 to the fifth wheel mount of the towing vehicle. The dampening members 13 allow the mounting plates 20 of the first assembly 11 to swing in an arc with respect to the side plates 19 of the second assembly 12. The swinging motion of the first assembly 11 with respect to the second assembly 12 allows longitudinal forces between the towed vehicle and the towing vehicle to be redirected into moving the first assembly 11 through the arc and thereby diminishing the amount of force transferred directly to either the towing vehicle or the towed vehicle. In the alternate, the perimeter wall 25 of the second assembly 12 is mounted to the towing vehicle. The locking pin is inserted through the notch 28 in the locking plate 27 and the locking bore 29 of the perimeter wall 25 to inhibit the first assembly 11 from swinging with respect to the second assembly 12 to facilitate coupling the head assembly 22 to the hitch pin of the towed vehicle. The locking pin is then removed to allow the first assembly 11 to swing with respect to the second assembly 12 so that longitudinal forces between the towed vehicle and the towing vehicle swing the first assembly 11 to minimize the amount of force directly transferred between the towing vehicle and the towed vehicle. A plurality of shock absorbing assemblies 30 may be operationally coupled between the swing plates 23 and perimeter wall 25 to provide additional dampening of longitudinal forces between the towing vehicle and the towed vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch dampening system for damping longitudinal movement of a towed vehicle with respect to the towing vehicle, the hitch dampening system comprising:
   a first assembly configured to be hitched to the towed vehicle;
   a second assembly configured to be mounted on the towing vehicle; and
   a plurality of dampening members each being pivotally mounted on said first assembly and on said second assembly, said dampening members suspending said first assembly from said second assembly such that movement of said first assembly in a forward or rearward longitudinal direction from a substantially central neutral position swings said first assembly in a vertical plane with respect to the second assembly;
   wherein at least a portion of said first assembly is positioned over a portion of said second assembly.

2. The hitch dampening system as set forth in claim 1, further comprising:
   a pin member being coupled to said second assembly and configured to be inserted into a fifth wheel mount of the towing vehicle such that said pin member is coupled to the towing vehicle.

3. The hitch dampening system as set forth in claim 1, wherein each of said dampening members is pivotally mounted to said first assembly at a respective first pivot mounting, and wherein each of said dampening members is pivotally mounted to said second assembly at a respective second pivot mounting; and
   wherein said second pivot mounting of each said dampening member is located at a vertical level higher than said first pivot mounting of said dampening member.

4. The hitch dampening system as set forth in claim 1, wherein swing movement of said first assembly in said vertical plane in either of the forward or rearward longitudinal directions from the neutral position causes said first assembly to move upwardly from said neutral position such that gravity biases said first assembly toward said neutral position and gravity resists movement of said first assembly in the forward or rearward longitudinal direction.

5. The hitch dampening system as set forth in claim 1, wherein movement of said first assembly in a horizontal direction causes vertically upward movement of said first assembly relative to said second assembly.

6. The hitch dampening system as set forth in claim 1, wherein said first assembly is longitudinally swingable with respect to said second assembly between forward and rearward positions, said neutral position being located substantially centrally between said forward and rearward positions, said first assembly being at a lowest vertical level with respect to said second assembly in said neutral position and moving to a vertically higher level with respect to said second assembly as said first assembly moves toward said forward position or said rearward position such that gravity biases movement of said first assembly toward said central neutral position and gravity resists movement of said first assembly toward said forward position or said rearward position.

7. The hitch dampening system as set forth in claim 1, wherein said dampening members form the only connection between said first assembly and said second assembly.

8. A hitch dampening system for damping longitudinal movement of a towed vehicle with respect to the towing vehicle, the hitch dampening system comprising:
   a first assembly for being operationally coupled to the towed vehicle;
   a second assembly for being operationally coupled to the towing vehicle; and
   a plurality of dampening members being operationally coupled between said first assembly and said second assembly, said dampening members permitting said first assembly to swing in an arc with respect to said second assembly such that said dampening members are adapted for reducing longitudinal forces exerted on the towing vehicle by the towed vehicle when a momentum of the towed vehicle differs from a momentum of the towing vehicle;
   a pin member being coupled to said second assembly, said pin member being adapted for being coupled to a fifth wheel mount of the towing vehicle such that said pin member is for operationally coupling the towed vehicle to the towing vehicle when the towed vehicle is to be towed by the towing vehicle;

said second assembly comprising a base plate and pair of side plates, each of said side plates being oppositely coupled to said base plate such that said side plates and said base plate define a channel, said first assembly being suspended in said channel by said dampening members such that said dampening members are positioned between said side plates and said first assembly to permit said first assembly to swing in said channel, said pin member being coupled to said base plate of said second assembly.

9. The hitch dampening system of claim 8, wherein each of said dampening members comprises a swing arm, said swing arm of each of said dampening members being rotatably coupled to said first assembly, said swing arm of each of said dampening members being rotatably coupled to said second assembly opposite said first assembly such that said swing arm of each of said dampening members comprises the radius of the arc said first assembly swings with respect to said second assembly to reduce the force exerted on the towing vehicle by the towed vehicle when the momentum of the towed vehicle differs from the momentum of the towing vehicle;

each of the dampening members comprising a pair of pivot rods, each of said pivot rods being a coupled to opposing ends of said swing arm of the associated one of said dampening members, one of said pivot rods being rotatably coupled to said first assembly such that the other one of said pivot rods is rotatably coupled to said second assembly, said pivot rods being for permitting said swing arm of the associated one of said dampening members to rotate with respect to said first assembly and said second assembly such that said first assembly swings in an arc with respect to said second assembly;

each of said dampening members comprising a pair of bearing portions, each of said bearing portions being operationally coupled to one of said pivot rods of the associated one of said dampening members, said bearing portions being for facilitating rotation of said pivot arms with respect to said first assembly and said second assembly;

said first assembly comprising a pair of mounting plates, each of said dampening members being coupled to one of said mounting plates such that said dampening members are positioned between the associated one of said mounting plates and an associated one of said side plates of said second assembly, said mounting plates being adapted for being mounted to the towed vehicle such that said mounting plates are for operationally coupling the towed vehicle to said second assembly; and said first assembly comprising a reinforcing member, said reinforcing member being coupled to said mounting plates such that said reinforcing member extends between the mounting plates, said reinforcing member being for maintaining positioning of said mounting plates such that said reinforcing member is for inhibiting collapsing of said mounting plates and damaging the towed vehicle and the towing vehicle.

10. A hitch dampening system for damping longitudinal movement of a towed vehicle with respect to the towing vehicle, the hitch dampening system comprising:

a first assembly for being operationally coupled to the towed vehicle;

a second assembly for being operationally coupled to the towing vehicle; and a plurality of dampening members being operationally coupled between said first assembly and said second assembly, said dampening members permitting said first assembly to swing in an arc with respect to said second assembly such that said dampening members are adapted for reducing longitudinal forces exerted on the towing vehicle by the towed vehicle when a momentum of the towed vehicle differs from a momentum of the towing vehicle;

a pin member being coupled to said second assembly, said pin member being adapted for being coupled to a fifth wheel mount of the towing vehicle such that said pin member is for operationally coupling the towed vehicle to the towing vehicle when the towed vehicle is to be towed by the towing vehicle;

said first assembly comprising a pair of mounting plates, each of said dampening members being coupled to one of said mounting plates such that said dampening members are positioned between the associated one of said mounting plates and said second assembly, said mounting plates being adapted for being mounted to the towed vehicle such that said mounting plates are for operationally coupling the towed vehicle to said second assembly.

11. The hitch dampening system as set forth in claim 10, further comprising:

said first assembly comprising a reinforcing member, said reinforcing member being coupled to said mounting plates such that said reinforcing member extends between the mounting plates, said reinforcing member being for maintaining positioning of said mounting plates such that said reinforcing member is for inhibiting collapsing of said mounting plates and damaging the towed vehicle and the towing vehicle.

* * * * *